United States Patent [19]

Le Deit

[11] Patent Number: 4,595,084
[45] Date of Patent: Jun. 17, 1986

[54] DRUM BRAKES

[75] Inventor: Gérard Le Deit, Courtry, France

[73] Assignee: Societe Anonyme D.B.A., Paris, France

[21] Appl. No.: 661,496

[22] Filed: Oct. 15, 1984

[30] Foreign Application Priority Data

Oct. 26, 1983 [FR] France .................. 83 17097

[51] Int. Cl.⁴ .............................. F16D 51/00
[52] U.S. Cl. ......................... 188/328; 24/114.5;
  74/501 R; 188/106 A; 403/206; 403/353;
  428/582
[58] Field of Search ............ 188/328, 2 D, 78, 79.5 P,
  188/106 F, 106 A, 106 R, 24.22; 74/501 R;
  72/379; 428/577, 582, 583; 24/114.5, 129 W,
  128; 403/206, 207, 353

[56] References Cited

U.S. PATENT DOCUMENTS

| | | | |
|---|---|---|---|
| 2,044,958 | 6/1936 | Thomas | 188/106 A |
| 2,329,943 | 9/1943 | Robins | 403/206 X |
| 2,666,504 | 1/1954 | Berno et al. | 188/106 A X |
| 2,924,116 | 2/1960 | Abbott | 188/106 A |
| 3,064,767 | 11/1962 | Weiger | 188/78 |
| 3,255,849 | 6/1966 | Swift | 188/106 A |
| 3,517,779 | 6/1970 | Bolinbaugh | 188/78 |
| 3,661,233 | 5/1972 | Margetts et al. | 188/106 A |
| 3,743,060 | 7/1973 | Hendrickson | 188/106 F |
| 4,146,117 | 3/1979 | Kawaguchi et al. | 188/79.5 P |
| 4,167,990 | 9/1979 | Steer et al. | 188/205 A |
| 4,387,792 | 6/1983 | Imamura | 188/328 |

FOREIGN PATENT DOCUMENTS

| | | |
|---|---|---|
| 2842638 | 4/1979 | Fed. Rep. of Germany ....... 188/328 |
| 1273303 | 8/1961 | France . |
| 2020708 | 7/1970 | France . |
| 2033148 | 11/1970 | France . |
| 2404766 | 4/1979 | France . |

Primary Examiner—Bruce H. Stoner, Jr.
Assistant Examiner—Michael P. Gilday
Attorney, Agent, or Firm—Larry J. Palguta; Ken C. Decker

[57] ABSTRACT

The invention concerns the construction of a blank with a view to manufacturing a handbrake control lever (34) for a drum brake. The blank defines two fingers situated essentially at the extension of the body of the blank, one of the fingers is to be folded back to form a trough (62) to accept a cable, the other finger is to be positioned relative to the trough (62) so as to prevent the cable from escaping from the latter.

2 Claims, 10 Drawing Figures

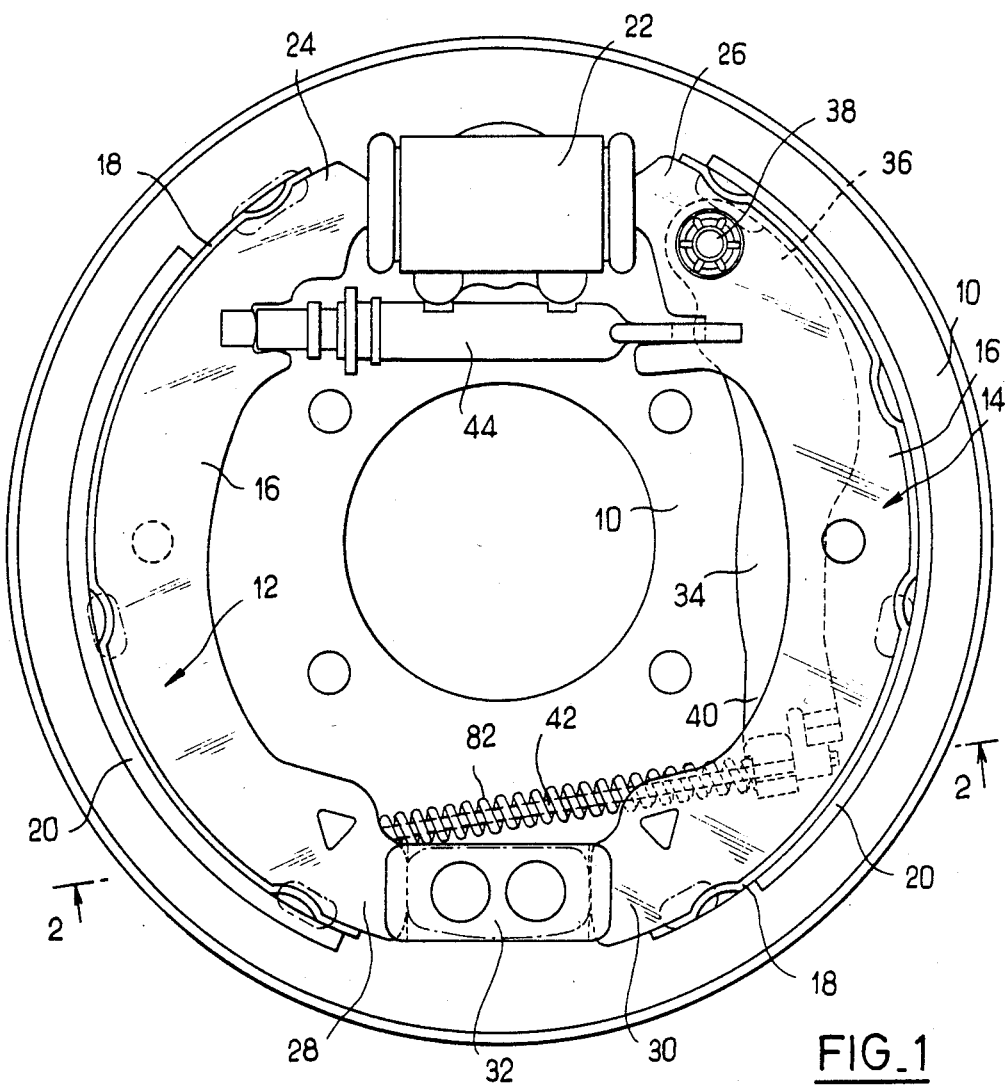
FIG_1
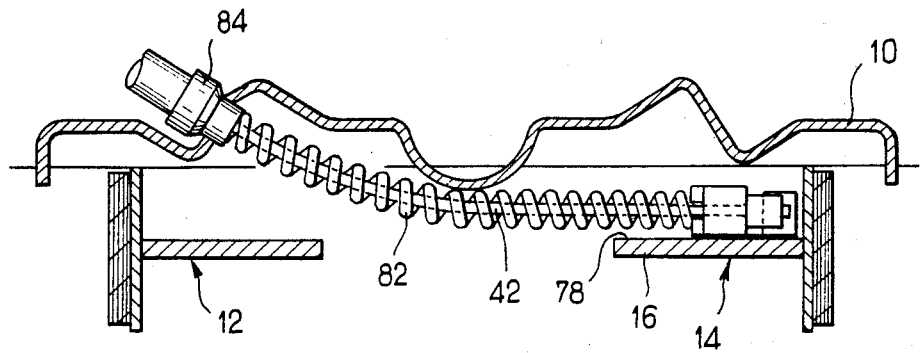
FIG_2

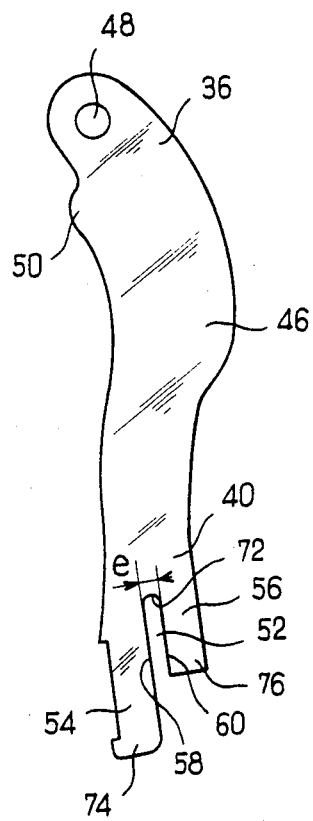
FIG_3
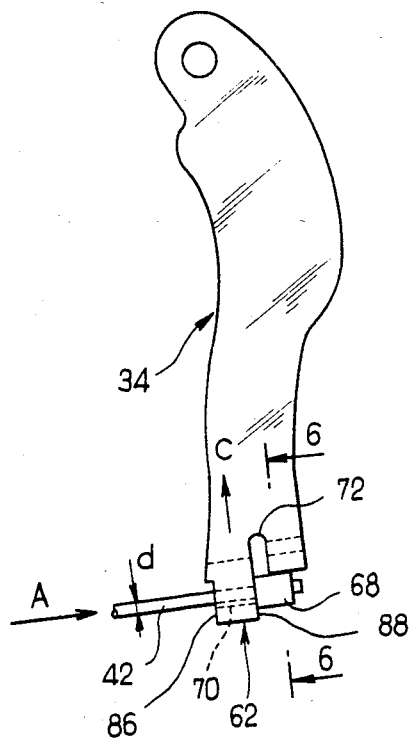
FIG_4
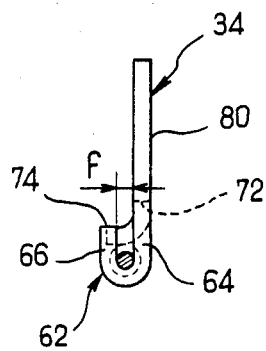
FIG_5
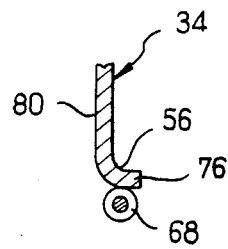
FIG_6

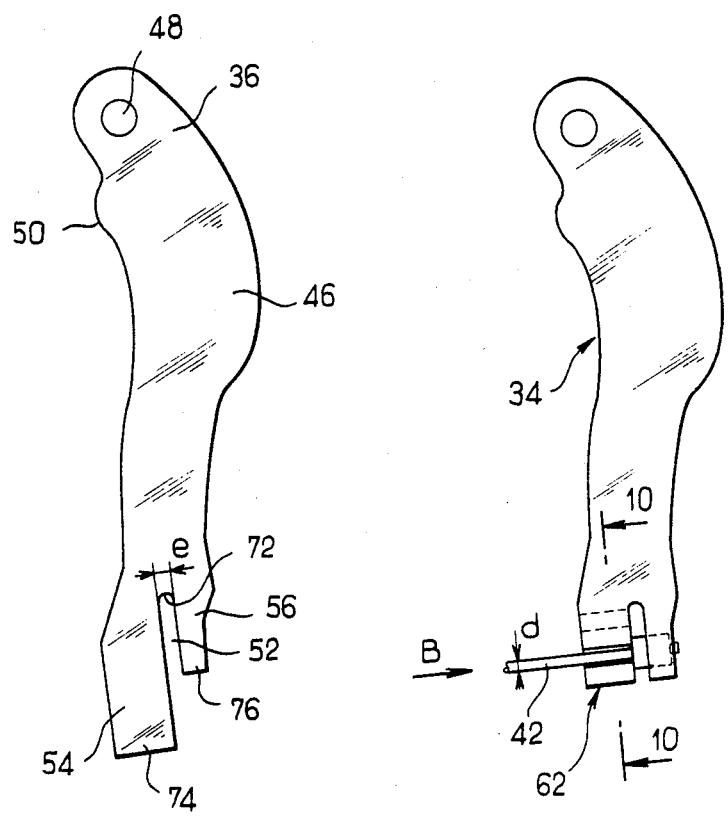
FIG_7    FIG_8
FIG_9    FIG_10

DRUM BRAKES

The invention concerns drum brakes of the type in which a fixed support carries, so as to be capable of sliding, two brake shoes carrying friction linings intended to cooperate with a rotating drum, two adjacent ends of these shoes being separated during brake application by a device for mechanical control incorporating a lever articulated at one end on one of the shoes and cooperating at its other end with a cable for operating the lever, a strut being positioned between this lever and the other shoe. The invention aims, more specifically, to provide a simple blank for the construction of a lever used in a device for the mechanical control of the actuation of a drum brake of the type defined above.

The French Patent published under No. 2,033,148 proposes a blank for constructing a mechanical control lever made from a metal plate by a simple blanking operation. The solution revealed has, nevertheless, several disadvantages. We shall mention the axial space occupied by the lever; in fact the lug folded back at 90° occupies a not inconsiderable space between the shoe and the back plate; on the other hand, in order to withstand the cable tension the lug must have a considerable longitudinal dimension so as to provide sufficient strength and not to be unfolded when the cable is under tension; lastly the shape of the lug which extends beyond one edge of the body of the blank does not permit economical blanking from a metal strip because the waste material between the different blanks would be relatively large.

The present invention proposes to provide a blank of more robust design, not incorporating the disadvantages mentioned above.

With this aim, the invention proposes a blank intended for the construction of a lever for a device for the mechanical control of a drum brake, characterized in that the blank incorporates a body of considerable length, having at one end an opening designed to accept a joint articulated with a web of a brake shoe, and at its other end an oblong notch forming two fingers, each essentially parallel to the longitudinal axis of the said body.

To construct the lever from the blank a first finger of the two is folded into a trough, the folding axis being essentially normal to the longitudinal axis of the corresponding finger. The width of the notch between the two fingers being slightly greater than the diameter of the cable, the latter is introduced into this notch, and then, by tilting, is introduced into the trough, in which the cable is held by means of the second finger which cooperates with the headed end of the cable, preventing the latter from escaping from the trough by translation.

A lever thus constructed has a small thickness dimension, the security and retention of attachment being assured.

Other characteristics of the present invention will emerge from the following description of two embodiments, given by way of illustration but not limiting in any way, with reference to the accompanying drawings, in which:

FIG. 1 is a front view of a drum brake constructed according to the invention;

FIG. 2 is a sectional view along the line 2—2 shown in FIG. 1;

FIG. 3 is a front view of a blank intended for the construction of a lever for a device for the mechanical control of the brake shown in FIGS. 1 and 2;

FIG. 4 is a front view of a lever constructed from the blank shown in FIG. 3, in which is shown a cable and its end;

FIG. 5 is a partial view along the arrow A shown in FIG. 4;

FIG. 6 is a partial section along the line 6—6 shown in FIG. 4;

FIG. 7 is a front view similar to that shown in FIG. 3 showing a variant of the invention;

FIG. 8 is a front view of a lever constructed from the blank shown in FIG. 7;

FIG. 9 is a partial view along the arrow B shown in FIG. 8;

FIG. 10 is a partial section along the line 10—10 shown in FIG. 8.

The drum brake shown in FIGS. 1 and 2 incorporates a back plate 10 which carries, so that they are capable of sliding, two shoes 12 and 14 each incorporating a web 16 and a rim 18, the latter carrying friction linings 20. These friction linings 20 are capable of entering into frictional engagement with a rotating drum (not shown) through a brake actuator 22 positioned between two adjacent ends 24 and 26 of the shoes 12 and 14, respectively. The other two ends 28 and 30 of the shoes bear against an anchor component 32 by means of a spring (not shown), the anchor component 32 being firmly fixed to the back plate 10. In the same way, a spring (not shown) retains the ends 24 and 26 of the shoes so as to bear against the brake actuator 22.

In a manner which is conventional for manual braking, brake actuation is carried out through a device for mechanical control incorporating a lever 34, articulated at one end 36 on the shoe 14, and more precisely, close to the end 26 of the latter, by means of a shaft forming a pivot 38. The other free end 40 of the lever 34 cooperates with an operating cable 42 joined to a lever situated in the driving compartment (not shown). In a conventional manner, the lever 34 cooperates with a strut 44 to push apart the ends 24 and 26 of the shoes. The strut 44 is capable of incorporating a device for automatic adjustment to compensate for the wear of the friction components 20.

FIGS. 4, 5 and 6 show the lever 34 constructed, in accordance with the invention, from the blank shown in FIG. 3. The blank shown in FIG. 3 incorporates a body 46 of considerable length, having at one end 36 an opening 48 designed to form an articulated joint by means of the pivot 38. A projection 50 close to the end 36 is provided on the blank to cooperate with the strut 44, this projection 50 forming an intermediate point along the length of the body 46 of the lever 34. The other end 40 of the body 46 incorporates an oblong notch essentially parallel to the longitudinal axis of the body 46 and forming first and second fingers 54 and 56, respectively. These two fingers 54 and 56 are separated by the first and second sides 58 and 60, respectively, of the notch 52. These two sides of the notch 52 are essentially parallel to each other, and essentially parallel to the principal axis of the body 46. The distance e separating the sides 58 and 60 of the notch 52 is slightly greater than the diameter d of the cable 42. As may be seen in FIG. 3, the two fingers 54 and 56 are of unequal lengths.

Referring to FIGS. 4 to 6, it may be seen that in order to form the lever 34 from the blank shown in FIG. 3, the finger 54 is first folded back so as to form a trough 62 whose folding axis is essentially normal to the longitudinal axis of the finger 54. The trough 62 thus formed incorporates a first side 64 situated in the extension of the body of the blank, the other side 66 of the trough 62 being folded back so as to be essentially parallel to the plane of the blank 46, and at a distance f from the first side 64 and from the blank 34, the distance f being slightly greater than the diameter d of the cable 42. The second finger 56 is folded so as to be perpendicular to the body of the blank 46, the folding axis of the finger 56 being essentially normal to the principal axis of this finger 56. As may be seen in FIGS. 4 to 6, the cable 42 has at its end a headed end 68 of a diameter greater than that of the cable 42, and of a length greater than the width e of the notch 52; thus, the finger which is folded back 56 is capable of cooperating with this headed end 68 so as to prevent translation of the cable 42 upwards, referring to FIG. 4, that is to say parallel to the bottom 70 of the trough 62, in the direction of the arrow C shown in FIG. 4, the stiffness of the cable preventing the headed end 68 from becoming disengaged relative to the finger which is folded back 56. Designating the bottom of the notch 52 by the reference 72, it may be seen that this bottom is closer to the opening 48 than the free end 74 of the first finger which is folded back 54. In the same way, it may be seen that the bottom 72 is closer to the opening 48 than the free end 76 of the second finger 56.

When the lever 34 shown in FIGS. 4, 5 and 6 is mounted in the brake shown in FIGS. 1 and 2, the surface 80 of the lever 34 is positioned on the surface 78 of the web 16. The articulated joint is then placed in position by means of the pivot 38, which is immobilized in a known manner. In this position, it will be observed that the two fingers 54 and 56, which are folded back, are situated remote from the surface 78 of the web and there is no risk of their interfering with the latter. In a conventional manner, the cable 42 is provided with a compression spring 82, firstly to allow better sliding of the cable relative to the fixed support 10, and secondly so that the spring 82 holds under tension the portion of the cable contained within the brake by bearing, at one end, against a sheath ferrule 84, and at the other end, against the headed end of the cable through the brake lever.

To mount the cable onto the handbrake lever, the following procedure is carried out: the lever 34 is disengaged, by rotating in a clockwise direction, from the shoe 14, which causes the end 40 of the latter to appear. After compressing the spring 82, the cable 40 is introduced into the slot 52, taking care that the headed end 68 is between the lever and the fixed backplate 10. When the cable is brought to bear against the bottom 72 of the notch 52 the cable is pivoted so that the portion of diameter d enters the trough 62, while the headed end 68 is positioned, with the aid of the rounded surface where the finger 56 is folded, opposite the end 76 of the finger 56. On releasing the spring 82, the latter comes to bear against the end 86 of the trough 62 while the headed end 68 comes to bear against the second end 88 of the trough 62. As may be seen in FIGS. 4 and 5, the headed end 68 comes to bear against the face of the trough 62, and consequently there is no risk of deforming this bearing portion under the tensile force of the cable.

FIGS. 8, 9 and 10 show a variant of the lever, shown in FIGS. 4 to 6, obtained from the blank shown in FIG. 7. The same reference numbers are used for components fulfilling similar functions. In this embodiment, the first finger 54 also forms a trough 62 to accept the cable 42, but this trough is formed by double folding of the finger 54 such that the latter opens in a direction perpendicular to the plane of the body 46 of the lever 34, that is to say that the two sides 64 and 66 of the trough 62 are essentially perpendicular to the principal plane of the body of the blank. The first fold 90 of the finger 54 shown in FIG. 9 is situated further from the opening 48 than the bottom 72 of the notch 52. In this embodiment, the finger 56 is flat and is situated in the extension of the body 46 of the blank.

The mounting of the cable 42 is carried out in the same manner as for the preceding embodiment except, however, that the cable 42 naturally enters the trough 62 when, after having offered the cable to the lever in a perpendicular direction, the latter is tilted until it is essentially in the plane of the lever 34. It may also be seen that the second finger 56 prevents the cable 42 from leaving the trough 62, against which it bears through the headed end 68.

It goes without saying that the two embodiments described are only examples and that they may be modified without departing from the framework of the invention.

I claim:

1. In a mechanical actuator linkage for separating adjacent ends of a pair of brake shoes carrying friction linings for engagement with a rotatable drum, and at least one of said shoes having a radial web, the improvement comprising a lever including a body portion of substantial longitudinal length having opposite first and second ends, said body portion adjacent said first end having an opening adapted to receive a pivotal connection with said radial web of said one brake shoe and having at said second end first and second longitudinally extending fingers separated by a longitudinally extending slot, said first finger reversely bent to form a U-shaped trough and a free end of said first finger extending in a plane substantially parallel to a plane defined by the longitudinal length of the body portion, the free end being disposed a predetermined distance from an adjacent surface of the body portion so that a cable is received within said trough, the cable having a boss of predetermined longitudinal length attached to said cable and the boss abutting a transverse side of the first finger so that the boss is positioned below and enclosing an open end of the longitudinally extending slot, the second finger bent substantially perpendicular relative to the adjacent surface of the body portion so that a free end of the second finger extends above the boss and no further than said predetermined distance from said adjacent surface, the second finger bent to extend on a side of the lever having said adjacent surface and providing a flat transverse surface engaging a longitudinal portion of the predetermined longitudinal length of said boss so that the boss is secured relative to movement toward the first end of the lever and the cable captured in the trough.

2. In a mechanical actuator linkage for separating adjacent ends of a pair of brake shoes carrying friction linings for engagement with a rotatable drum, and at least one of said shoes having a radial web, the improvement comprising a lever including a body portion of substantial longitudinal length having opposite first and second ends, said body portion adjacent said first end having an opening adapted to receive a pivotal connection with said radial web of said one brake shoe and having at said second end first and second longitudinally extending fingers separated by a longitudinally extending slot, said first finger reversely bent to form a U-shaped trough extending substantially perpendicular to a plane defined by the longitudinal length of the body portion, a free end of the first finger extending substantially perpendicularly to said plane and being disposed a predetermined distance from a closed end of said slot so that a cable is received within said trough, the cable having a boss of predetermined longitudinal length attached to said cable and the boss abutting a transverse side of said first finger so that the boss is positioned adjacent said slot and at an adjacent side surface of said lever, the second finger extending longitudinally in said plane defined by the longitudinal length of the body portion so that a flat second finger surface comprising a portion of the adjacent side surface engages a longitudinal portion of the predetermined longitudinal length of the boss, a free end of the second finger positioned substantially at said predetermined distance from the closed end of the slot, and the boss being secured positionally by the second finger so that the cable is captured within said U-shaped trough.

* * * * *